June 27, 1972  T. J. KOMOLY  3,673,032
PROCESS FOR THE PRODUCTION OF THERMOPLASTIC
SHEETS HAVING LONGITUDINAL AND
TRANSVERSE CORRUGATIONS Original Filed Aug. 5, 1966  3 Sheets-Sheet 1

INVENTOR
THOMAS JOHN KOMOLY
BY Cushman, Darby & Cushman
ATTORNEYS

INVENTOR
THOMAS JOHN KOMOLY
BY Cushman, Darby & Cushman
ATTORNEYS

INVENTOR
THOMAS JOHN KOMOLY
BY Cushman, Darby & Cushman
ATTORNEYS

United States Patent Office 3,673,032
Patented June 27, 1972

---

3,673,032
PROCESS FOR THE PRODUCTION OF THERMOPLASTIC SHEETS HAVING LONGITUDINAL AND TRANSVERSE CORRUGATIONS
Thomas John Komoly, London, England, assignor to Imperial Chemical Industries Limited, London, England
Continuation of application Ser. No. 570,586, Aug. 5, 1966. This application Mar. 17, 1971, Ser. No. 125,433
Claims priority, application Great Britain, Aug. 6, 1965, 33,736/65
Int. Cl. B31f 1/20
U.S. Cl. 156—210
14 Claims

ABSTRACT OF THE DISCLOSURE

Thermoplastic polymeric sheet of improved rigidity is formed by passing a longitudinally corrugated extruded thermoplastic polymeric sheet in the longitudinal direction between two means for introducing further corrugations or undulations in said sheet, whereby the sheet is permitted to move in the longitudinal direction but restrained from movement in any other direction relative to the points, said sheet being in a mouldable state during at least part of its travel between said means and further corrugations or undulations being introduced into said sheet by reciprocating said means relative to one another.

---

This application is a continuation of Ser. No. 570,586 filed Aug. 5, 1966, now abandoned.

This invention relates to thermoplastic sheet.

In a substantially flat extruded sheet of substantially uniform thickness and width corrugations may conveniently be formed about two perpendicular axes which are contained in the plane of the sheet and are respectively in the direction of extrusion and transverse thereto; these axes are referred to herein as the extrusion axis and the transverse axis.

When reference is made herein to "longitudinally corrugated sheet" we mean that the grooves formed by the corrugations run parallel to the extrusion axis. Similarly reference to "transversely corrugated sheet" means that the grooves run parallel to the transverse axis.

Longitudinally or transversely corrugated thermoplastic sheet is useful in applications such as packaging since it possesses an increased resitance to bending stresses applied about lines at right angles to the grooves formed by the corrugations when compared with uncorrugated sheet of the same material and thickness. Its resistance to bending stresses applied about the grooves themselves is, however, no greater than that of uncorrugated sheet.

We provide a process for the production of thermoplastic polymeric sheet of improved rigidity which comprises passing in the longitudinal direction a longitudinally corrugated (as hereinbefore defined) extruded thermoplastic polymeric sheet from a first station to a second station, said sheet being in a mouldable state as hereinafter defined during at least part of its travel between said stations, said stations being reciprocated relative to one another so that further corrugations or undulations are introduced into said longitudinally corrugated sheet.

By "mouldable state" we mean that the sheet is at such a temperature that it possesses insufficient resilience substantially to recover from the applied further corrugations or undulations while it is sufficiently resilient not substantially to lose the longitudinal corrugations already present in said sheet. At the same time the viscosity in the mouldable state should be such that the sheet is sufficiently fluid to be deformed but insufficiently fluid to lose the existing corrugations. Thus the sheets of the present invention will normally be at a temperature just above their melting point and of a thermoplastic material which is suitable for melt extrusion. Temperatures at or just below the melting point may be used in the case of those materials which soften over a wide range of temperatures and temperatures considerably above the melting point may be used in the case of those materials which possess sufficiently viscosity at that temperature e.g. materials having a high molecular weight.

Thermoplastic materials which may be used in the process of our invention include, for example, polyethylene, polypropylene and other poly-α-olefines, polyvinyl chloride, polymers and copolymers of styrene e.g. styrene/maleic anhydride copolymers, polymethyl methacrylate and copolymers of methyl methacrylate with acrylic acid and alkyl acrylates, polyoxymethylenes, polycarbonates, polyamides and polyesters, preferably high molecular weight polyamides and polyesters. We prefer to use polyolefines, polyvinyl chloride and polymethyl methacrylate because these polymers are in the mouldable state as hereinbefore defined over a relatively wide range of temperatures. However, polymers having a relatively sharply defined melting point, e.g. poly 4-methyl pentene-1 and high molecular weight polyamides and polyesters e.g. polyhexamethylenediamine adipate or polyethylene terephthalate are also preferred because only a relatively small degree of cooling is required in order to "freeze" the corrugations imparted by our process into the extruded sheet.

Each station of the present invention is a point which permits the sheet to move in the longitudinal direction but which restrains movement of the sheet in any other direction relative to the station. It may consist for example of a pair of nip rollers or endless belts or of a slottted or channelled plate in which the sheet is a sliding fit.

The first of said stations may conveniently be the die of the extruder from which the sheet is produced. Alternatively the first station may comprise a heating means for softening the cold sheet so that it attains the mouldable state. However the sheet may at the first station be at a temperature below that at which it attains the mouldable state in which case said second station comprises a heating means or, preferably, a heating means is situated between said stations; in this latter case the heating means are preferably out of direct physical contact with the sheet, e.g. it is a radiant heating means.

Quenching means must be provided in order to reduce the temperature of the sheet so that it is no longer in the mouldable state as hereinbefore defined, thus to set the said further corrugations or undulations into the sheet. Such a quenching means may comprise any of the quenching means known in the art, e.g. a water bath or a blast of air and is preferably situated at the point of said second station or between said stations. The distance over which the sheet is in the mouldable state is of course determined by the distance between the said first station, if the sheet is in the mouldable state thereat, or the position of the heating means if the sheet is not in the mouldable state at said first station and the quenching means. Factors governing the magnitude of this distance will be the amplitude and wavelength of the corrugations or undulations to be introduced and the longitudinal rate at which the sheet is moving.

By further undulations introduced into the longitudinally corrugated sheet we mean that the grooves formed by the corrugations, although still running in the direction of the extrusion axis, are not parallel to this axis throughout their entire length, but are periodically laterally displaced to one side or the other, e.g. by following a sinusoidal or other curve the mean position of which is parallel to the extrusion axis. By reference herein to "longitudinal undulation" we mean such said further undulation.

Said stations may be reciprocated relative to one another by reciprocating both of said stations but we prefer to reciprocate only one of said stations. The reciprocating motion is preferably either in the plane of said sheet and transverse to the direction of travel of the sheet thus producing longitudinal undulations as hereinafter defined or in a direction mutually perpendicular to both the extrusion axis and the transverse axis of the sheet thus producing transverse corrugations as hereinbefore defined. The amplitude and wavelength of the corrugations or undulations introduced will be determined by the amplitude and frequency of the relative reciprocating motion and by the speed of travel of the sheet. It is preferred that longitudinal undulations are imparted to the longitudinally corrugated sheet and that their amplitude is at least equal to the lateral spacing of the existing longitudinal corrugations. It is also preferred that the wavelength of the longitudinal undulations is such that these undulations cross their axis at an angle of about 45° since this leads to the greatest strength. Such a condition is satisfied by undulations in the form of a sinusoidal curve having a wavelength of $\pi$ times its amplitude.

It will be understood that both longitudinal undulations and transverse corrugations may be introduced into the longitudinally corrugated sheet and it is convenient to do this in two separate operations when it is preferred that the operation to introduce transverse corrugations is carried out first.

Fillers (including fibrous fillers) and other additives may be incorporated into the thermoplastic material of which the sheets are made. Material expanded by blowing agents may also be used, e.g. foamed sheets of polystyrene or of a copolymer of styrene and maleic anhydride.

The sheets produced by the process of the present invention which contain longitudinal corrugations and longitudinal undulations may be used in the production of laminates, e.g. with a flat sheet or sheets of the same or different material. A particularly useful laminate is that in which one of these sheets is sandwiched between two flat sheets. A convenient process which may be used in the production of this laminate is to contact the sheet while still in the mouldable state as hereinbefore defined with the two flat sheets which are preferably also in the mouldable state (e.g. which are freshly extruded) and to pass the assembly through laminating means which press the three layers together without substantially destroying the corrugations and undulations in the central sheet. In this laminating process the corrugated sheet may be extruded through a corrugated die which is transversely reciprocated to produce longitudinal undulations, and the flat sheets may be extruded through stationary flat dies spaced on either side of said corrugated die. In this laminating process it is preferred that when the three sheets are brought together there is sufficient pressure between them to prevent them from slipping over one another. Three layer laminates may also of course be made after the sheet has cooled below the mouldable state by means of adhesively laminating two flat facing sheets or by melt extrusion of the flat sheets onto each side of the cold sheet according to our invention.

The sheets and laminates produced according to the present invention may be used in the production of packages. Although such sheets have been produced in the past, vacuum forming techniques have been required and the present process provides a cheaper and faster method of production.

The invention will now be described with reference to the accompanying drawings in which FIG. 1 is an elevational view of an apparatus for the introduction of longitudinal undulations FIG. 2 is a view on section A—A of FIG. 1

Figure 1:
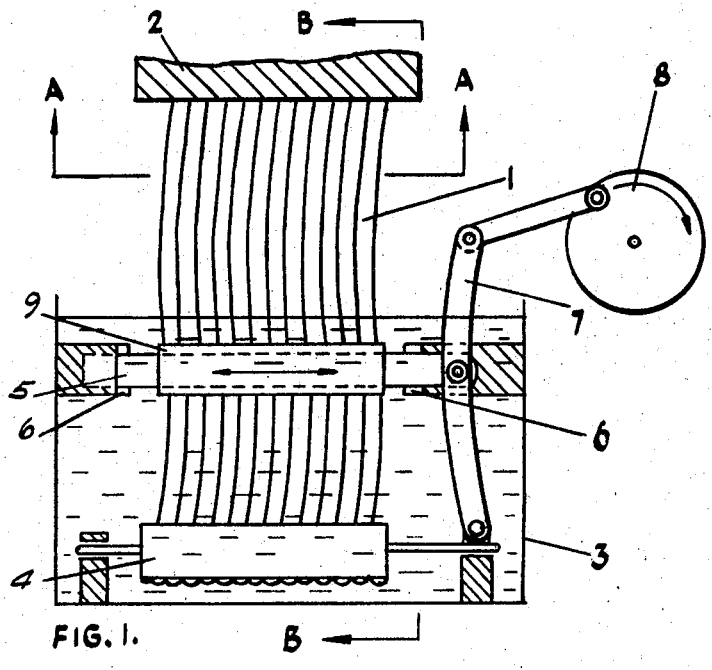
Figure 3:
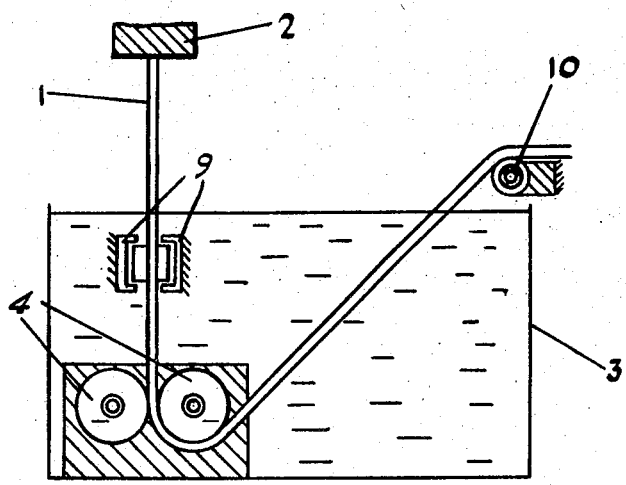
FIG. 3 is a view on section B—B of FIG. 1
Figure 2:
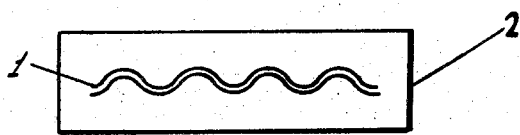

In FIG. 1 longitudinally corrugated sheet 1 is extruded from corrugated die 2 (see FIG. 2) and enters quench bath 3, at the bottom of which it is hauled off by nip rollers 4. Rod 5 is slidably mounted in bearings 6 and is connected at one end to lever 7 which is oscillated by oscillating device 8. Members 9 attached to rod 5 lightly grip the corrugated sheet 1 so that the sheet is oscillated from side to side as it passes between grips 9. The corrugated and undulated sheet is removed from the quench bath over idler roller 10.

Figure 4:
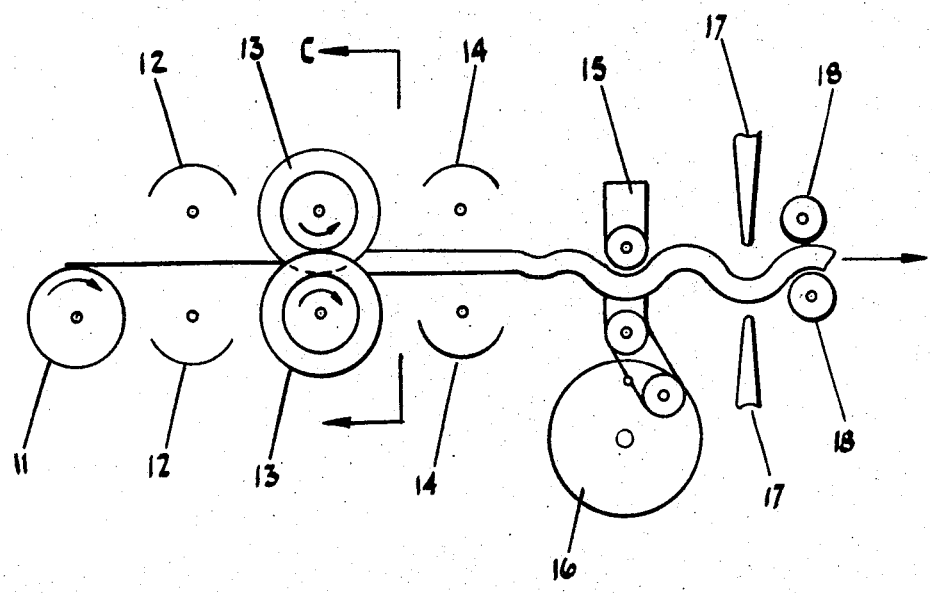
FIG. 4 is an elevational view of an apparatus for the introduction of transverse corrugations
Figure 5:
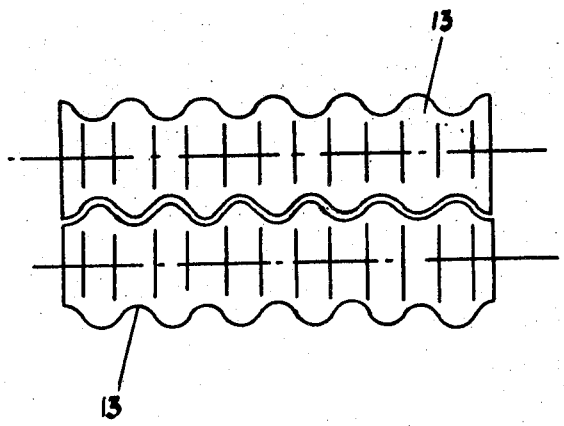
FIG. 5 is a view on section C—C of FIG. 4

In FIGS. 4 and 5 a roll of flat film 11 is fed between infra-red heaters 12 to rollers 13 which are so shaped (see FIG. 5) that they impart longitudinal corrugations into the sheet and thence passed between further infra-red heaters 14, bar 15 which is oscillated by device 16, and jets 17 which blow cold air on to the film to quench it and it is finally hauled off by nip rollers 18.

Figure 6:
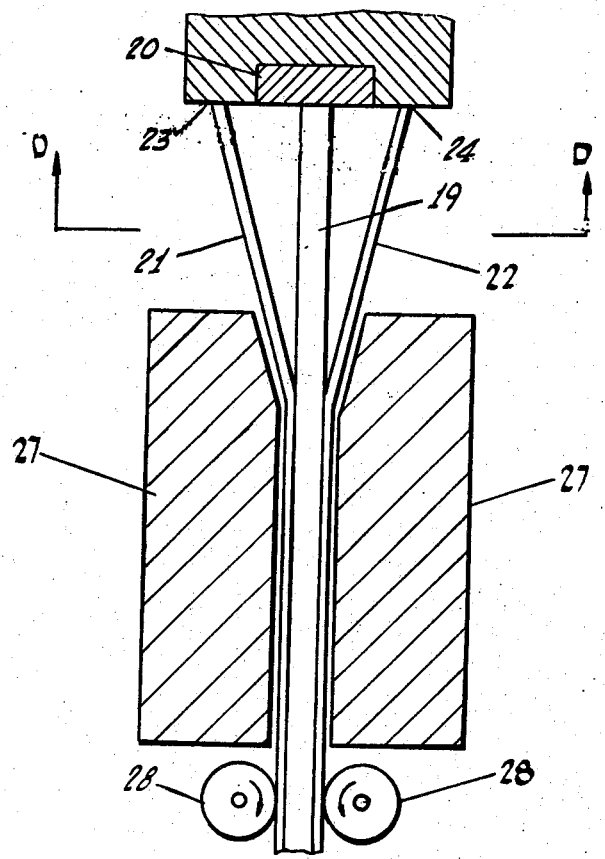
FIG. 6 is an elevational view of an apparatus for the production of a laminate in which the central section is a corrugated sheet and FIG. 7 is a view on section D—D of FIG. 6.
Figure 7:
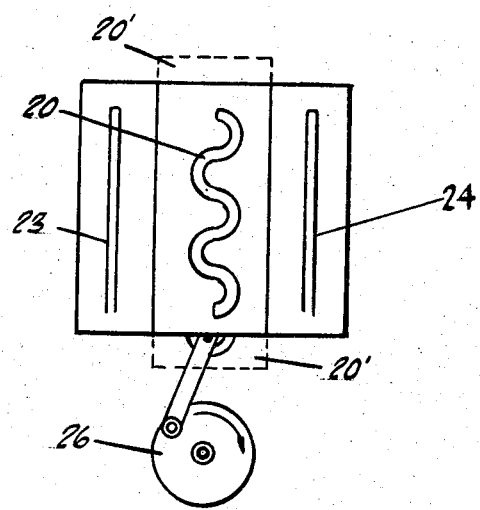

In FIGS. 6 and 7 a central sheet 19 is extruded from die 20 and outer sheets 21 and 22 from flat dies 23 and 24. Die 20 is connected by bar 25 to oscillating device 26 and this oscillates between the extreme positions shown at 20' in FIG. 7. The three extruded sheets are fed between converging plates 27 which are internally or externally water cooled and which press the three sheets together. The laminate produced is hauled off by nip rollers 28.

As examples of corrugated sheets which may be produced by the process of this invention it has been found that sheets of width from 2 inches up to 6 feet having between 0.2 and 100 corrugations per inch and having an amplitude of from 0.002 to 4 inches may be produced at extrusion speeds of from 5 to 100 feet per minute. The amplitude of the longitudinal undulations introduced into the longitudinally corrugated film may range from 0.01 inch to 5 inches and the wavelength from 0.01 inch to 120 inches.

We prefer to measure the stiffness of the sheets by the "Kenley" stiffness test which is described in British Standard 3748 of 1964. In this test the resistance to bending is measured by the force in grams necessary to deflect a rectangular test piece (1.5 inches wide by at least 2.75 inches long) held at one end, through a bending angle of 15° when this force is applied at a distance 1.97 inches from the fixed end over a time interval of from 2.5 to 30 seconds. Uncorrugated sheet of thickness 0.01 inch has a "Kenley" stiffness in the range 10 to 50. Longitudinally corrugated sheet has a stiffness of from 300 to 700 in one direction but is only of stiffness 10 to 50 in the transverse direction. We found that sheet which has been longitudinally undulated in addition to being longitudinally corrugated has a stiffness in both directions within the range 200 to 500.

I claim:

1. A process for the production of thermoplastic sheets having longitudinal and transverse corrugations and having improved rigidity which comprises the steps of:
    (1) longitudinally corrugating a thermoplastic polymeric sheet by extrusion at elevated temperatures through a corrugated die,
    (2) heating the longitudinally corrugated sheet to a temperature sufficient to allow further deformation of said sheet but insufficient to lose the existing corrugation,
    (3) moving the said sheet in a longitudinal direction parallel to said corrugation and periodically laterally displacing the said sheet by reciprocating the said sheet in the plane of the sheet and transverse to the axis of the said longitudinal corrugations to produce longitudinal undulations in said longitudinal corrugations, and (4) cooling the so corrugated and undulated sheet.

2. A process according to claim 1 in which said sheet is of a polyolefine.

3. A process according to claim 1 in which said sheet is of polyvinyl chloride.

4. A process according to claim 1 in which said sheet is of polyethylene terephthalate.

5. A process according to claim 1 in which said sheet is of polyhexamethylene adipate.

6. A process according to claim 1 in which said sheet contains a filler.

7. A process according to claim 1 in which said sheet before or during said process is expanded by a blowing agent.

8. A process according to claim 1 wherein the said sheet is reciprocated by moving said sheet from a first station to a second station and during at least part of the travel between said stations, at least one of said stations is reciprocated relative to said other station.

9. A process according to claim 8 in which one of said stations is reciprocated, the other of said stations being held stationary.

10. A process according to claim 9 wherein the said reciprocation of the said sheet is obtained by restraining the said sheet from transverse movement at said first station and reciprocating in a transverse direction the said sheet at said second station.

11. A process according to claim 8 in which said sheet is heated to said temperature by a heating means situated between said stations.

12. A process according to claim 10 in which said first station is the die of an extruder.

13. A process according to claim 1 in which a flat sheet is laminated on either side of said sheet after corrugation and undulation.

14. A process according to claim 13 in which said flat extruded sheets are extruded from slit dies spaced on either side of a die from which said corrugated sheet is concurrently extruded.

References Cited

UNITED STATES PATENTS

| 389,624 | 9/1888 | Wilson | 161—133 |
| 2,826,239 | 3/1958 | Villoresi | 161—133 |
| 2,963,128 | 12/1960 | Rapp | 161—133 |
| 3,399,098 | 8/1968 | Omoto et al. | 161—133 |

FOREIGN PATENTS

| 1,115,029 | 4/1956 | France | 161—133 |

MORRIS SUSSMAN, Primary Examiner

U.S. Cl. X.R.

156—244; 264—167, 177, 210; 161—130